3,838,161
PROCESS FOR THE PRODUCTION OF
ISOTHIAZOLYL COMPOUNDS
Srinivasachari Rajappa, Bombay, India, assignor to Ciba-Geigy Corporation, Ardsley, N.Y.
No Drawing. Filed July 11, 1972, Ser. No. 270,754
Claims priority, application Switzerland, July 15, 1971, 10,413/71
Int. Cl. C07d 91/12
U.S. Cl. 260—302 A        7 Claims

ABSTRACT OF THE DISCLOSURE

Substituted isothiazolyl-alkyl-guanidines of the formula

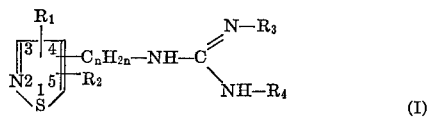

(I)

their tautomeric forms and acid addition salts thereof are potent myocardial catecholamine depletors as well as hypotensive and antihypertensive agent.

---

The present invention relates to isothiazolyl compounds of the general formula I

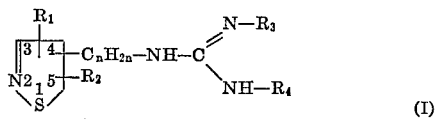

(I)

wherein

R₁ and R₂ each independently represent hydrogen or a lower alkyl radical,

R₃ and R₄ each independently represent hydrogen, a lower alkly radical, or the radicals R₃ and R₄ taken together represent a lower alkylene radical, by which the bound nitrogen atoms are separated by at least 2 carbon atoms, and n is an integer from 1–4, and their tautomeric compounds and salts. Each of the substituents R₁ and R₂ or the radical

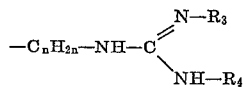

may be bound in 3-, 4- or 5-position.

The lower alkyl groups R₁ to R₄ are, e.g. methyl, ethyl, n-proply, isopropyl, n-butyl, isobutyl, sec. butyl, tert. butyl, n-pentyl, isopentyl, neopentyl, n-hexyl, isohexyl or n-heptyl groups, preferably, however, methyl, ethyl, n-propyl, isopropyl, n-btuyl, isobutyl or tert. butyl groups. A lower alkylene radical R₃+R₄ is preferably a 1,2-ethylene or 1,3-propylene radical, but also, e.g. a 1,2-propylene, 1,2-, 1,3-, 1,4-, or 2,3-butylene, 2,3-, 2,4- or 1,5-pentylene, 1,4-hexylene or 2,6-heptylene radical. The alkylene radical C$_n$H$_{2n}$, which can be straight or branched, preferably represents methylene or ethylidene, or also one of the alkylene radicals mentioned for the group R₃+R₄ having at most 4 carbon atoms.

The term 'lower' in connection with the above or subsequently mentioned organic compounds, groups and radicals defines those having at most 7 carbon atoms, preferably, however, those having at most 4 carbon atoms.

Surprisingly we have found that the new compounds possess valuable pharmacological properties. They are above all potent myocardial catecholamine depletors as can be shown by animal tests on rats and cats. The doses used for this purpose are between approximately 0.5 mg./kg. and 30 mg./kg. The new compounds are thus particularly suitable for the treatment and control of myocardial insufficiency, such as, e.g. for the treatment of Angina pectoris.

Furthermore the new compounds have hypotensive and antihypertensive properties, which can be verified by animal tests with rats as the experimental animals.

The new compounds of the present invention may be administered enterally or parenterally, e.g. orally (or directly into the lumen of the small intestine) or intravenously. In the case of oral administration, the compounds according to the invention can be administered, e.g. as gelatine capsules, or in the form of aqueous solutions or dispersions. The dosage amounts used are between about 0.5 and 50 mg./kg. per day, preferably between 1 and 30 mg./kg. per day, particularly, however, between 5 and 20 mg./kg. per day. The lowering action on the blood pressure is recorded either on non-anaesthetised, normotensive dogs after peroral administration, or on renally hypertensive rats.

Accordingly, the new compounds of the invention are valuable antihypertensive agents which can be used, for example, for the treatment of primary or secondary hypertension.

The compounds according to the invention an also be employed as intermediates in the preparation of other products, especially pharmacologically effective compounds.

Particulaly compounds, which are to be mentioned, are compounds of formula Ia

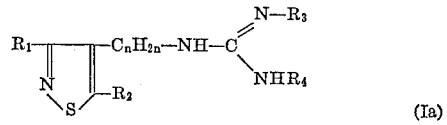

(Ia)

wherein R₁, R₂, R₃, R₄ and n have the meanings as defined under formula I, as well as their tautomeric forms and acid addition salts.

Particularly valuable pharmacological properties, especially a depletory action on the catecholamines, and antihypertensive properties are displayed, however, by compounds of formula Ia, wherein R₁ represents hydrogen or a lower alkyl group having at most 4 carbon atoms, and R₂, R₃ and R₄ denote hydrogen, and n represents the whole number 1, as well as their tautomeric forms and acid addition salts.

A compound which may be mentioned on account of, in particular, its antihypertensive property is N-[(3-methyl-4-isothiazolyl)methyl]-guanidine in the form of its sulphate (2:1), with which are obtained outstanding antihypertensive effects when the compound is administered orally in doses of 5 to 20 mg./kg. per day to rats having increased blood pressure.

The new compounds are produced by methods known per se which are suitable for the preparation of substituted guanidines.

For example, a compound of the general formula I is produced by the reaction of a 4-aminoalkylisothiazole of the general formula II

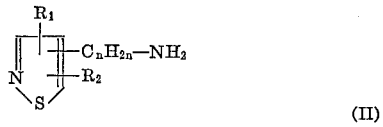

(II)

wherein R₁, R₂ and n have the meanings given under formula I, or of its salts, with a compound of the general formula III

(III)

or with its salts, wherein X represents the radical $R_3$, or X and Y together with the CN-double bond form a CN-triple bond (nitrile group), or Y denotes a cleavable radical such as a lower alkylmercapto radical, lower alkoxy radical or a pyrazole radical, or stands for an amino or lower alkylamino group; and, optionally, the conversion of an obtained compound within the defined scope into another compound of the invention; and, optionally, the conversion of an obtained free compound into a salt.

Compounds of formula III are, for example, S-lower alkylpseudothioureas, e.g. S-methyl-, S-ethyl-, S-propyl- or S-butylpseudothioureas, O-lower alkylpseudoureas, e.g. O-methyl- or O-ethylpseudoureas, cyanamides, 1-guanyl-pyrazoles or guanidines, or their salts, particularly those with inorganic acids, e.g. hydrohalic acids, phosphoric acid, nitric acid, or preferably sulphuric acid.

1-Guanyl-pyrazoles can moreover contain substituents in the nucleus, e.g. a lower alkyl group in the 3- and/or 5-position. Of the above-mentioned compounds of the general formula III, the etherified pseudothioureas or pseudoureas are preferably employed.

According to a second process, compounds of the general formula I can be produced by the ammonolysis or aminolysis of a compound of the general formula IV

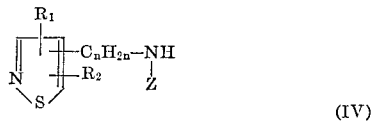
(IV)

or of its salts, wherein Z represents one of the groups $-CN$, $-CONHR_4$, $-CSNHR_4$, $RO-\overset{|}{C}=NR_3$ or $RS-\overset{|}{C}=NR_3$, wherein R stands for lower alkyl, and each of the substituents $R_1$ and $R_2$ have the above given meanings, with a compound of the formula $H_2NR'$, wherein the radical R' represents hydrogen or lower alkyl; and, optionally, the conversion of an obtained compound within the defined scope into another compound of the invention; and, optionally, the conversion of an obtained free compound into a salt.

The ethers of formula IV preferred in this process, i.e. compounds in which Z represents the group

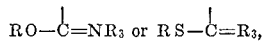

are lower alkyl ethers, e.g. methyl, ethyl, propyl or butyl ether. The ammonia used for ammonolysis, or the primary amine of formula $H_2NR'$, can moreover be released during the reaction according to the process of corresponding salts or complex compounds, e.g. ammonium sulphate, methylammonium acetate or hexamethylene-tetramine.

According to a third process, compounds of the general formula I are produced by the reduction in a compound of the general formula V

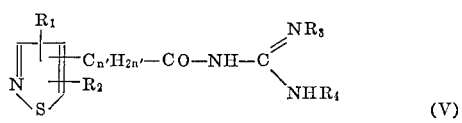
(V)

or in its salts, wherein $n'$ is zero or an integer from 1 to 3, and $R_1$, $R_2$, $R_3$ and $R_4$ have the above given meanings, of the carbonyl group to a methylene group; and, optionally, the conversion of an obtained compound within the defined scope into another compound of the invention; and, optionally, the conversion of an obtained free compound of the general formula I into a salt.

The reduction can be performed with simple or complex earth metal hydrides such as boron hydrides, or preferably alkali metal- or alkaline-earth metal-aluminum hydrides, e.g. lithium-, sodium- or magnesium-aluminum hydrides. Optionally, Lewis acids, e.g. aluminum chloride, can be used as activators in the reductions to be carried out.

According to a further process, compounds of the general formula I can be produced by the reaction of a compound of the general formula VI

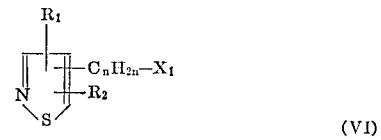
(VI)

wherein $R_1$, $R_2$ and $n$ have the above given meanings, and $X_1$ represents a reactive esterified hydroxyl group, with a guanidine of formula VII

(VII)

wherein $R_3$ and $R_4$ have the above mentioned meanings, or with its salts; and, optionally, the conversion of an obtained compound within the defined scope into another compound; and, optionally, the conversion of an obtained free compound of the general formula I into a salt.

The reactive esterified hydroxy group $X_1$ in the starting materials of formula VI is esterified, e.g. with strong inorganic acids such as hydrohalic acids, e.g. hydrochloric acid, hydrobromic acid, hydroiodic acid, or sulphuric acid, or especially with organic sulphonic acids such as lower alkanesulphonic acid or benzenesulphonic acid, e.g. methane, ethane or p-toluenesulphonic acid. The reaction is preferably performed in the presence of condensation agents, e.g. alkali metal carbonates or alkali metal bicarbonates, or tertiary nitrogen bases.

The starting materials are known or, if new, can be produced by methods known per se. For example, the aminoalkylisothiazoles of the general formula II required in the first process are produced from the corresponding halogenoalkyl derivatives [Literature: Indian J. Chem. 7, 103 (1969)], which are, in their turn, produced, starting with a corresponding 4-alkylisothiazole, by halogenation with an N-halogenosuccinimide, preferably by bromination with N-bromosuccinimide. The obtained 4-($\alpha$-halogenoalkyl)-isothiazole is then hydrolysed or hydrazinolysed with ammonia, with a compound releasing ammonia, or preferably with an alkali metal phthalimide, e.g. potassium phthalimide, to the corresponding 4-($\alpha$-aminoalkyl)-isothiazoles.

The mentioned 4 - ($\alpha$ - halogenoalkyl)-isothiazoles can also be produced by reduction of 4-alkanoyl-isothiazoles with simple or complex light-metal hydrides, and esterification of the obtained alcohols with reactive derivatives of corresponding acids, e.g. with thionyl or phosphorus halides or -oxyhalides. The obtained 4-($\alpha$-halogenoalkyl)-isothiazoles can also be reacted with alkali metal cyanides, and the obtained nitriles reduced, e.g. with catalytically activated hydrogen, such as hydrogen in the presence of Raney-nickel, or with the mentioned complex light-metal hydrides, e.g. lithium aluminium hydride, to 4-($\beta$-aminoalkyl)-isothiazoles.

The previously mentioned 4-($\alpha$-aminoalkyl)-isothiazoles can also be produced by reduction, e.g. by catalytic hydrogenation, of oximes which can be obtained from the above mentioned 4-alkanoyl-isothiazoles.

The obtained 4-($\alpha$- or $\beta$-aminoalkyl)-isothiazoles can be converted by methods known per se. e.g. by reaction with sodium nitrite in an acid medium, and hydrolysis of the obtained diazonium salt by the heating of its aqueous solution until nitrogen is evolved, into the corresponding 4-($\alpha$- or $\beta$-hydroxyalkyl)-isothiazoles. These can be converted, as described above, with thionyl or phosphorus halides into the halides which yield, by reaction with alkali metal cyanides, and after reduction of the obtained nitriles, 4-(γ- or δ-aminoalkyl)-isothiazoles.

The isothiazolyl-4-alkanoylguanidines of formula V used in the third process are new compounds and, for their part, a constituent of the present invention.

The isothiazolyl-4-alkanoylguanidines can be prepared from the known corresponding isothiazolyl-4-alkylcarboxylic acids by direct reaction with guanidine or guanidine derivative, or by reaction of an ester or of a reactive functional derivative of the carboxyl group.

The 4-aminoalkyl-isothiazoles of the general formula II mentioned in the first process can be transformed into the starting compounds of the second process of the general formula IV. For example, the 4-amino compounds are reacted with cyanogen halides, isocyanates or isothiocyanates; and, optionally, the obtained ureas or thioureas etherified with reactive esters of alkanols, e.g. with the above mentioned esters, to give O-alkyl-pseudoureas or S-alkyl-pseudothioureas.

The cyanamide of the general formula III mentioned in the first process can be produced from a nitroso-guanidine in situ, such as, e.g. methylcyanamide from 1-nitroso-3-methylguanidine.

The ammonia or the primary amines employed in the second described process can be produced in situ, during the reaction, from the corresponding salts or complex compounds, such as, e.g. ammonium sulphate or hexamethylenetetramine.

The obtained compounds of the present invention can be converted into each other by methods known per se. Thus, an unsubstituted guanidine can be substituted by aminolysis with monoalkylamines.

The processes described here can be carried out, in the usual manner, at room temperature, with cooling or heating, under normal or increased pressure and, if necessary, in the presence or absence of a diluent, catalyst or condensation agent. If necessary, the reactions may also be performed in the atmosphere of an inert gas such as, e.g. nitrogen.

Depending on the reaction conditions, the new compounds are obtained in the free form or in the form of their salts, particularly acid addition salts; salts are likewise embraced by the present invention. Obtained salts can be converted, in a manner known per se, into other salts or into the corresponding free compounds, e.g. by treatment with bases such as alkali hydroxides, or with suitable ion exchangers. Acid addition salts, which can also be used as intermediates, e.g. in the case of the purification of the free compounds (e.g. by conversion of a free compound into a salt, isolation of the salt, and liberation of the free compound from the salt), or for identification purposes (e.g. the picrates), are principally pharmaceutically acceptable, non-toxic acid addition salts, such as those with inorganic acids, e.g. hydrochloric acid, hydrobromic acid, sulphuric acid, phosphoric acid, nitric acid or perchloric acid or with organic acids such as aliphatic, cycloaliphatic, cycloaliphatic-aliphatic, aromatic, araliphatic, heterocyclic or heterocyclic-aliphatic carboxylic or sulphonic acids, e.g. formic, acetic, propionic, succinic, glycolic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicyclic, embonic, methanesulphonic, ethanesulphonic, 2-hydroxyethanesulphonic, ethylenesulphonic, halogenobenzenesulphonic, toluenesulphonic, naphthalenesulphonic, sulphanilic or N-cyclohexylsulphamic acids. Salts with acids such as the above are preduced in the usual manner, e.g. by treatment of the free compound with an acid, or with a suitable ion exchanger.

Furthermore, it is also possible to treat salts of inorganic acids with metal salts, such as, e.g. sodium, barium or silver salts, of an acid in a suitable solvent in which the obtained inorganic compounds are insoluble.

These or other salts of the new compounds, such as, e.g. the picrates, can also be used for the purification of the obtained bases, this being effected by conversion of the bases into salts, separation of these, and liberation of the bases again from the salts. In consequence of the close relationship between the bases in the free form and in the form of their salts, the expression "free bases" in the preceding part and in the following is logically meant to cover, optionally, also the corresponding salts.

Isomer mixtures can be separated in a known manner; for example, obtained racemates can be split up into their optically active d- and l-forms by recrystallisation from optically active solvents, or by treatment of the racemic mixture with an optically active acid, preferably in the presence of a suitable solvent.

Examples of suitable optically active acids are the d- and l-tartaric acids, optically active forms of malic acid, mandelic acid and other optically active acids.

The invention relates also to those embodiments of the process in which the starting compound is a compound obtainable as an intermediate at some stage, the necessary further stages of the process being then completed; or where the process is discontinued at some stage; or to embodiments in which a starting material is formed under the reaction conditions, or is used in the form of a salt.

For the reactions according to the invention, the starting materials particularly employed are those which yield the above mentioned preferred compounds.

The new compounds of the present invention can be used as pharmaceutical compositions, e.g. in the form of pharmaceutical preparations which are suitable for enteral administration, e.g. oral or parenteral administration, and which contain the active substances in the free form or in the form of their salts, together with organic or inorganic, solid or liquid carriers.

Suitable dosage units, such as dragées, tablets, capsuls, suppositories or ampoules, contain as active substance 1–100 mg., preferably 5–50 mg., of a compound of the general formula I, or of a pharmaceutically acceptable acid addition salt thereof. It is moreover possible to use corresponding amounts of preparations, suspensions and emulsions which are not administered as individual doses, such as in the case of syrups and elixirs.

In dosage units for oral administration, the content of active substance is preferably between 10% and 90%. Such dosage units are produced by the combination of the active substance with, e.g. solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate, or polyethylene glycols, to form tablets or dragée cores.

The latter are coated, for example, with concentrated sugar solutions which may also contain, e.g. gum arabic, talcum and/or titanium dioxide; or with a lacquer dissolved in readily volatile organic solvents or solvent mixtures. Dyestuffs can be added to these coatings; e.g., for identification of the various doses of active substance. Further suitable oral dosage units are hard gelatine capsules, as well as soft closed capsules made from gelatine and a softener such as glycerin. The hard capsules contain the active substance preferably as a granulate in admixture with lubricants such as talcum or magnesium, and, optionally, stabilisers such as sodium metabisulphite ($Na_2S_2O_5$) or ascorbic acid. In soft capsules the active substance is preferably dissolved or suspended in suitable liquids such as liquid polyethylene glycols, to which likewise stabilisers may be added.

Suitable dosage units for rectal administration are, e.g. suppositories consisting of a combination of an active substance with a suppository mixture based on natural or synthetic triglycerides (e.g. cocoa butter), polyethylene glycols or suitable higher fatty alcohols; and gelatine rectal capsules containing a combination of the active substance with polyethylene glycols.

Ampoule solutions for parenteral administration, particularly intramuscular or intravenous administration, contain, for example, a compound of the general formula I, in a concentration of preferably 0.5–5%, as an aqueous dispersion prepared with the aid of conventional solubility-promoting agents and/or emulsifiers; or preferably an aqueous solution of a pharmaceutically acceptable, water-soluble acid addition salt of a compound of the general formula I.

In the case of liquids to be taken orally, such as syrups and elixirs, the concentration of the active substance is designed to enable single doses to be easily measured out, e.g. as the content of a tea-spoon or of a measuring spoon containing, e.g. 5 ml., or as a multiple of this volume. Suitable syrups are, for example, solutions of water-soluble acid addition salts, or suspensions of insoluble but absorbable acid addition salts, in aqueous solutions of sugars and/or alkanepolyols, such as unrefined sugar or sorbitol or glycerin, flavourings and aromatics, as well as, optionally, preservatives and stabilisers. Elixirs are aqueous-alcoholic solutions of a compound of the general formula I, or of pharmaceutically acceptable salts thereof, which may likewise contain the additives mentioned in the case of syrups. Further oral preparations to be mentioned are dropping-solutions which usually have a higher alcohol content and, at the same time, a higher content of active substance, so that a single dose can be measured out, e.g. as 10 to 50 drops.

The following Examples (a) to (f) illustrate the production of some typical preparations, but these examples, however, in no way represent the only embodiments of such preparations.

Instead of the active substances contained therein, it is also possible to use other active substances, e.g. the acid addition salts mentioned after the general formula I.

(a) An amount of 250.0 g. of active substance is mixed with 550.0 g. of lactose and 292.0 g. of potato starch; the mixture is moistened with an alcoholic solution of 8 g. of gelatine, and granulated through a sieve. The obtained granulate is dried and 60.0 g. of potato starch, 60.0 g. of talcum, 10.0 g. of magnesium stearate and 20.0 g. of colloidal silicon dioxide are mixed in; the mixture is then pressed into 10,000 tablets each weighing 125 mg. and each containing 25 mg. of active substance. The tablets can optionally be provided with grooves for a more precise adjustment of the dosage amount.

(b) A granulate is prepared from 100.0 g. of active substance, 379.0 g. of lactose, and the alcoholic solution of 6.0 g. of gelatine; the granulate is then dried and mixed with 10.0 g. of colloidal silicon dioxide, 40.0 g. of talcum, 60.0 g. of potato starch and 5.0 g. of magnesium stearate; and the mixture finally pressed to obtain 10,000 dragée cores. These are subsequently coated with a concentrated syrup made from 533.5 g. of crystallised saccharose, 20.0 g. of shellac, 75.0 g. of gum arabic, 250.0 g. of talcum, 20.0 g. of colloidal silicon dioxide and 1.5 g. of dyestuff. After drying, the obtained dragées each weigh 150 mg. and each contain 10 mg. of active substance.

(c) An amount of 20.0 g. of active substance is dissolved in 1500 ml. of boiled pyrogen-free water, the solution being then made up to 2000 ml. with similarly treated water. The solution is filtered off and filled into 1000 ampoules each containing 2 ml., these being finally sterilised. A 2 ml. ampoule contains 20 mg. or 1.0% of active substance.

(d) An amount of 25.0 g. of active substance and 1975 g. of finely ground suppository foundation substance (e.g. cocoa butter) is thoroughly mixed and then melted. The melt is maintained homogeneous by stirring whilst being poured out to form 1000 suppositories each weighing 2.0 g. They each contain 25 mg. of active substance.

(e) For the preparation of a syrup containing 0.25% of active substance, 1.5 litres of glycerin, 42 g. of p-hydroxybenzoic acid methyl ester, 18 g. of p-hydroxybenzoic acid-n-propyl ester and, with slight heating, 25.0 g. of active substance are dissolved in 3 litres of distilled water; additions are then made to the solution of 4 litres of 70% sorbitol solution, 1000 g. of cryst. saccharose, 350 g. of glucose and an aromatic, e.g. 250 g. of Orange Peel Soluble Fluid of the firm Eli Lilly and Co., Indianapolis, or 5 g. each of natural lemon aroma and "Halb und Halb" essence, both manufactured by the firm Haarmann und Reimer, Holzminden, Germany; the obtained solution is filtered, and the filtrate made up with distilled water to 10 litres.

(f) In order to prepare a dropping solution containing 1.5% of active substance, 150.0 g. of active substance and 30 g. of sodium cyclamate are disolved in a mixture of 4 litres of ethanol (96%) and 1 litre of propylene glycol. A mixture is then prepared separately of 3.5 litres of 70% sorbitol solution with 1 litre of water; this mixture is subsequently added to the above mentioned active substance solution. An addition is thereupon made of an aromatic, e.g. 5 g. of cough-sweet aroma or 30 g. of grapefruit essence, both from the firm Haarmann and Reimer, Holzminden, Germany; and the whole is afterwards well mixed, filtered, and made up with distilled water to 10 litres.

The following examples illustrate the production of the new compounds of the general formula I; these examples, however, are not intended in any way to limit the scope of the invention. The temperatures are expressed in degrees Centigrade.

Example 1

(a) A mixture of 4.0 g. of 4-aminomethyl-3-methylisothiazole and 4.2 g. of 5-methylpseudothiourea sulphate in 30 ml. of water is refluxed for 2 hours; the reaction mixture is then cooled and filtered. The solid residue is recrystallised twice from water, and yields N-[(3-methyl-4-isothiazolyl)methyl]guanidine as sulphate of the formula

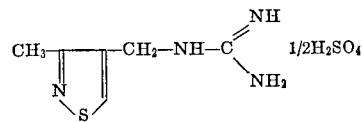

which melts at 297–300° C.

(b) The starting material for the above described synthesis is prepared as follows:

An amount of 5.7 g. of potassium phthalimide is added, with stirring, to a solution of 4.2 g. of 4-chloromethyl-3-methylisothiazole (Indian J. Chem. 7, 203 (1969)) in 20 ml. of dimethylformamide. The mixture is heated on a water bath for half an hour at 80°; it is afterwards cooled and diluted with 100 ml. of water. An addition is then made of 50 ml. of chloroform, in order to extract the organic constituents. The chloroform layer is washed with 30 ml. of 0.2-N. sodium hydroxide solution; it is subsequently washed with 30 ml. of water, and dried over sodium sulphate.

After removal of the chloroform by evaporation and after recrystallisation from a solvent mixture of ethyl acetate/hexane, the phtalimide derivative of the formula

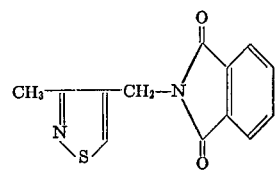

is obtained, which melts at 158–161° C.

A mixture of 5.0 g. of the above obtained phthalimide derivative and 1.5 ml. of 85% hydrazine in 50 ml. of methanol is refluxed for 1 hour, with a solid residue being precipitated. An amount of 25 ml. of water is added to this mixture, and the methanol present removed in vacuo. The obtained solid residue is treated with 25 ml. of concentrated hydrochloric acid, and refluxed on an oil bath, whilst stirring is maintained, for 2½ hours. The reaction mixture is cooled, the solid residue filtered off, and the obtained filtrate concentrated by evaporation almost to dryness. An amount of 10 ml. of cold water is added to the residue remaining, and the obtained mixture rendered alkaline with 6-N sodium hydroxide solution. The solution is subsequently saturated with solid sodium chloride, and repeatedly extracted with ethyl acetate. The organic layer is dried over sodium sulphate, and afterwards concentrated by evaporation to an oil. The obtained 4-aminomethyl-3-methylisothiazole of the formula

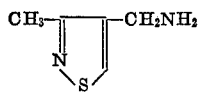

is distilled as oil at a boiling point of 115–117°/6 mm.

EXAMPLE 2

A mixture of 5.1 g. of 4-aminomethyl-3-methylisothiazole and 10 g. of N,N'-S-trimethylpseudothiourea in 100 ml. of ethanol is refluxed for 15 hours. After cooling of the reaction mixture, an amount of 200 ml. of dried ether is added, and the obtained solid residue filtered off, which is then recrystallised from a solvent mixture of abs. ethanol/ether. The obtained N,N'-dimethyl-N''-[(3-methyl-4-isothiazolyl)methyl]guanidine-hydroiodide of the formula

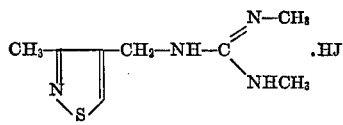

melts at 208–211° C.

A solution of 0.5 g. of the above obtained hydroiodide in 10 ml. of water is passed through a column containing 10 g. of the resin Amberlite IRA-400 (chloride form), and the column subsequently washed with 50 ml. of water. The combined eluates are concentrated in vacuo, and the residue recrystallised from an alcohol/ether mixture to obtain N,N'-dimethyl-N''-[(3-methyl-4-isothiazolyl)methyl]guanidine as hydrochloride, M.P. 225–227° C.

EXAMPLE 3

A mixture of 12.0 g. 5-aminomethyl-3-methylisothiazole and 12.0 g. 2-methyl-2-pseudothiourea sulphate in 50 ml. water was heated under reflux for 2 hours. On cooling a solid precipitated. It was filtered and washed with cold water; and then crystallised from water using animal charcoal. The obtained N-[3-methylisothiazolyl-5]-methyl guanidine sulphate of the formula

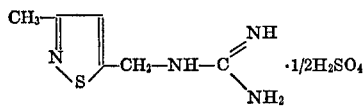

melts at 230–232° C.

EXAMPLE 4

(a) A mixture of 3.5 g. 3-aminomethylisothiazole and 4.2 g. of 2-methyl-2-pseudothiourea sulphate in 15 ml. distilled water was heated under reflux for 3 hours. The mixture was cooled and filtered and the crystals washed with cold distilled water. The product was recrystallised from distilled water using animal charcoal.

The obtained N-(3-isothiazolylmethyl) guanidine sulphate of formula

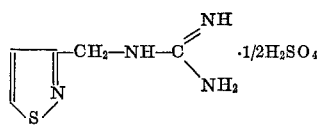

melts at 232–234° C.

(b) 3-Aminomethylisothiazole required for the above experiment was prepared as follows:

To 16.2 g. 3-bromomethylisothiazole in 60 ml. dimethyl formamide 17.5 g. of potassium phthalimide was added in small amounts with stirring. The temperature rose to 60° C. The mixture was heated on an oil bath at 80° C. for 1 hour and cooled. 100 ml. chloroform and 200 ml. water were added and the mixture stirred. The chloroform layer was separated, washed with 0.2 N NaOH solution and with water. It was then dried and evaporated to give a solid which was triturated with ether, filtered and dried, m.p. 121–124° C.

15.0 g. above phthalimido derivative, 5.0 g. hydrazine hydrate and 150 ml. methanol were heated under reflux with stirring for 1 hour. The mixture was cooled to 10° C., treated with 75 ml. concentrated hydrochloric acid and further heated under reflux for 3 hours at 130° C. It was then cooled and filtered. The precipitate was washed with water. The filtrate was evaporated nearly to dryness, and the residue cooled to 5° C. and basified carefully with 4 N NaOH. The resultant solution was saturated with sodium chloride, and extracted with 3 × 200 ml. ethyl acetate. The ethyl acetate extract was dried and evaporated to give crude 3-aminomethylisothiazole.

I claim:

1. A compound of the formula

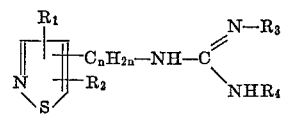

wherein $R_1$ and $R_2$ each independently represent hydrogen or a lower alkyl radical, $R_3$ and $R_4$ each independently represent hydrogen, a lower alkyl radical, or the radicals $R_3$ and $R_4$ taken together represent 1,2-ethylene or 1,3-propylene, and $n$ represents an integer from 1–4, and wherein each of the substituents $R_1$ and $R_2$ or the radical

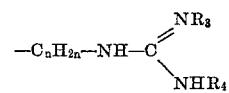

may be bound in 3-, 4- or 5-position, and their tautomers and pharmaceutically acceptable acid addition salts thereof.

2. A compound according to claim 1 which is of the formula Ia

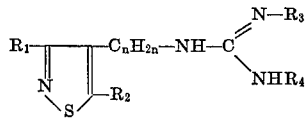

wherein $R_1$, $R_2$, $R_3$, $R_4$ and $n$ have the meanings given in claim 1, as well as their tautomers and pharmaceutically acceptable acid addition salts.

3. A compound according to claim 2 wherein $R_1$ represents hydrogen or a lower alkyl group having at most 4 carbon atoms, $R_2$, $R_3$ and $R_4$ represent hydrogen, and $n$ represents the integer 1, their tautomers and their pharmaceutically acceptable acid addition salts.

4. A compound according to claim 1 which is N-[(3-methyl-4-isothiazolyl)methyl]guanidine or a pharmaceutical addition salt thereof.

5. A compound according to claim 1 which is N,N'-dimethyl-N'-[(3-methyl-4 - isothiazolyl)methyl]guanidine or a pharmaceutical addition salt thereof.

6. A compound according to claim 1 which is N-[3-methylisothiazolyl-5]-methyl-guanidine or a pharmaceutical addition salt thereof.

7. A compound according to claim 1 which is N-(3-isothiazolylmethyl)-guanidine or a pharmaceutical addition salt thereof.

References Cited
UNITED STATES PATENTS

| 3,299,082 | 1/1967 | Jones et al. | 260—302 A |
|---|---|---|---|
| 3,271,407 | 9/1966 | Rapp et al. | 260—302 A |
| 3,741,507 | 10/1969 | Cronshaw | 260—302 A |

RICHARD J. GALLAGHER, Primary Examiner

U.S. Cl. X.R.

260—256.5 R, 302 H; 424—251, 270